US008640673B2

(12) United States Patent
Male

(10) Patent No.: US 8,640,673 B2
(45) Date of Patent: Feb. 4, 2014

(54) FUEL PIPE ASSEMBLY AND CLAMPING MEANS

(75) Inventor: Andrew Male, Walton on Thames (GB)

(73) Assignee: Delphi Technologies Holding S.arl, Luxembourg (LU)

( * ) Notice: Subject to any disclaimer, the term of this patent is extended or adjusted under 35 U.S.C. 154(b) by 601 days.

(21) Appl. No.: 13/004,132

(22) Filed: Jan. 11, 2011

(65) Prior Publication Data

US 2011/0174272 A1 Jul. 21, 2011

(30) Foreign Application Priority Data

Jan. 21, 2010 (EP) .................................... 10151332

(51) Int. Cl.
*F02M 55/02* (2006.01)
*B23P 11/00* (2006.01)

(52) U.S. Cl.
USPC .......................................................... 123/469

(58) Field of Classification Search
USPC ............ 123/469, 468, 470, 456; 285/148.17, 285/148.26, 420, 13, 89, 80; 251/145, 146
See application file for complete search history.

(56) References Cited

U.S. PATENT DOCUMENTS

| | | | | |
|---|---|---|---|---|
| 3,845,748 | A | 11/1974 | Eisenberg | |
| 4,445,713 | A * | 5/1984 | Bruning | 123/469 |
| 5,365,907 | A * | 11/1994 | Dietrich et al. | 123/470 |
| 6,199,539 | B1 | 3/2001 | Pearlman et al. | |
| 6,237,571 | B1 | 5/2001 | Harrison | |

FOREIGN PATENT DOCUMENTS

| | | | |
|---|---|---|---|
| DE | 4319269 | 12/1994 | |
| EP | 0569727 | 11/1993 | |
| EP | 0966604 | 12/1999 | |
| EP | 1167752 | 1/2002 | |
| JP | 2007085260 A * | 4/2007 | F02M 55/02 |

OTHER PUBLICATIONS

European Search Report dated Jul. 1, 2010.

* cited by examiner

*Primary Examiner* — Hieu T Vo
(74) *Attorney, Agent, or Firm* — Thomas N. Twomey

(57) ABSTRACT

A fuel pipe assembly for supplying fuel to a fuel injector located within a bore of an engine cylinder head comprises a tube nut for connecting the fuel pipe to the fuel injector and a securing arrangement comprising a locking nut and a deformable clamp member for securing the fuel pipe within the tube nut. The tube nut comprises a tubular member defining an axial bore to receive the fuel pipe, a distal end shaped for cooperation with the head of the fuel pipe, and a proximal end having an attachment mechanism for engaging a compatible attachment mechanism of the locking nut. The locking nut has an axial bore to receive the fuel pipe, and an attachment mechanism for engaging a compatible attachment mechanism of the tube nut. The clamp member defines a bore to receive the fuel pipe and is deformable under compression. In a first state of engagement, the locking nut and tube nut define a volume therebetween that accommodates the clamp member in an unstrained configuration and the fuel pipe is able to move laterally. In a second state of engagement, the clamp member is compressed between the locking nut and tube nut into a strained configuration such that lateral movement of the fuel pipe is constrained.

20 Claims, 5 Drawing Sheets

FUEL PIPE ASSEMBLY AND CLAMPING MEANS

TECHNICAL FIELD

This invention relates to a fuel pipe seal for use in a fuel line assembly that supplies fuel under high pressure to a fuel injector. In particular, the invention relates to a seal and clamping device for use in an arrangement of the type in which an injector is located within a bore provided in an engine cylinder head and fuel is supplied to the injector by a high pressure fuel pipe mounted to the cylinder head.

BACKGROUND OF THE INVENTION

In an internal combustion engine, it is known for a fuel pump to supply fuel at high pressure for delivery to each cylinder of the engine by means of a dedicated fuel injector. In a known arrangement, the fuel injector is received within a bore provided in a cylinder head of the cylinder (the “injector pocket”), and a high pressure (HP) fuel pipe (or fuel supply line) is used to provide a fluid connection between the fuel injector and the fuel pump or accumulator volume/common rail. Two such arrangements are known in the art: in a first arrangement (e.g. FIG. 1) the end of the HP fuel pipe that connects with the fuel injector is received within a bore extending through the cylinder head and connecting with the injector pocket; while in a second arrangement (e.g. FIG. 4) the HP fuel pipe is mounted over the cylinder head and connects with the injector at a point above the injector pocket.

SUMMARY OF THE INVENTION

In both arrangements, the injector is typically mounted centrally above the engine cylinder and there is a relatively large distance between it and the outside of the cylinder head towards the associated fuel pump and/or accumulator volume. Therefore, in the first arrangement (in which the fuel flow path is through the cylinder head), the HP fuel pipe is held in sealing engagement with the injector by a long rigid tube (the “tube nut”) which is typically loaded into the cylinder head by a threaded nut near the outside surface of the cylinder head. Similarly, in the second arrangement (in which the fuel connection is made above the cylinder head), the HP fuel pipe is held against the injector by a similarly long tube nut which is loaded by a thread at the injector end and may be tightened by a nut near the outer surface of the cylinder head.

Engines that have the connection between the HP fuel pipe and the injector at the injector pocket (which is within the fuel zone of the engine), require the HP fuel pipe to be sealed externally to prevent fuel leakage. This means that it is beneficial to have a seal between the tube nut (which secures the HP fuel pipe within the cylinder head) and the HP fuel pipe itself. On the other hand, engines that have this connection above the injector pocket (which is in the oil zone of the engine), may require a seal on the pipe at a position towards the outer end of the tube nut to eliminate “pockets” in which water and dust can be trapped, which might cause corrosion of the pipe and eventually lead to pipe failure.

In each of these prior art arrangements, the HP fuel pipe (and other components of the fuel supply line) can be adversely affected by engine vibrations, which can lead to undesirable vibrations and even resonance (at engine vibration frequencies) along the relatively long and flexible pipes. Movement of the HP fuel pipes relative to the engine can cause repetitive stress of the pipes, particularly at the end regions, and this can lead to premature fatigue failure. For this reason, it is quite common for such HP fuel pipes to have clamps attached to them to fix them relative to “stiff” parts of the engine and thereby reduce the risk of excessive motion and fatigue failure. Such clamps add to the complexity and cost of the engine apparatus (e.g. by increasing the number of components necessary), and also increase engine crowding.

It would be beneficial to reduce the number of components necessary for connecting an HP fuel pipe to a fuel injector in a cylinder head, without compromising the quality of the connection arrangement or the expected operational lifetime of the apparatus.

Furthermore, the sealing interface between the fuel pipe and the fuel injector must be capable of accommodating: (i) component variations due to manufacturing/machining tolerances in the exact position and surface contour of the sealing/seating surface (or cone) through which the HP fuel pipe connects to the fuel injector and the rail or pump; and (ii) assembly variations, such as the relative positions of the female cones of the mating components, which may require the distance between the nipple centres on the pipe to change between different engines. On medium-duty (MD) and heavy-duty (HD) engines, however, because of the need for increased fuel pressure to control engine exhaust emissions, the thickness of HP fuel pipes has increased from 6 mm to 8 mm (and above) to enable the increased tube wall thickness to suit the higher fuel pressures now used. These relatively large diameter pipes (e.g. in the region of 8 mm and above) have a corresponding relatively high stiffness, which can make it a significant challenge to optimally align the components of the fuel supply line (given the not insignificant variations in end cone position, for example), while forming the hydraulic connections in the fuel supply line. For this reason, the HP fuel pipe can be rejected during installation or may fail in operation. An exacerbating problem with the prior art arrangements described above, and particularly in the first arrangement in which the HP fuel pipe connects to the injector within the injector pocket, is that the tight fit of the tube nut and HP fuel pipe seals (which is necessary to prevent fuel leakage), greatly constrains the HP fuel pipe and prevents it from flexing sufficiently to accommodate component variations.

Hence, it would also be beneficial to have a fuel supply line arrangement and a fuel pipe seal that increases flexibility within the fuel supply line during assembly, thereby to increase tolerance of manufacturing variability and reduce fuel supply line problems and failures during and after assembly. In particular, it would be useful to have an HP fuel pipe seal (especially for MD and HD engines), which does not overly constrain the fuel pipe, but once installed allows the necessary sealing engagements and clamping of the fuel pipe to be maintained.

Accordingly, the invention relates to an HP fuel pipe seal and/or clamp and a fuel pipe assembly that overcomes or at least alleviates at least one of the above-mentioned problems and disadvantages in the prior art; and also to a fuel supply line arrangement and an engine comprising such a fuel pipe seal and/or clamp. The invention also relates to a method for assembling a fuel supply line that alleviates at least one of the aforementioned problems in the art.

In broad terms, the invention provides a high pressure (HP) fuel pipe clamp and/or seal, a fuel pipe assembly, and a fuel supply line arrangement that provides all necessary functionality and which provides desirable advantages over the prior art, such as greater simplicity and fewer components and, therefore, a lower cost of manufacture and relative ease of assembly. It may also avoid prior art design limitations on the size and location of various parts, such as clamps, and so take up less space within the increasingly complex and crowded engine space. The invention may also provide functional benefits in terms of reducing engine component wear or strain, thus increasing the expected useful lifetime of the components and assemblies.

In a first aspect the invention provides a fuel pipe assembly for supplying fuel to a fuel injector, the fuel injector to be located within a bore of an engine cylinder head; the fuel pipe assembly comprising: a tube nut for connecting the fuel pipe to the fuel injector; and a securing arrangement comprising a locking nut and a deformable clamp member (or clamp means) for securing the fuel pipe within the tube nut. The tube nut comprises a tubular member defining an axial bore therethrough to receive a length of the fuel pipe, a distal end shaped for cooperation with the head of the fuel pipe, and a proximal end having an attachment mechanism (or means) for engaging a compatible attachment mechanism (or means) of the locking nut. The locking nut is also provided with an axial bore to receive a length of the fuel pipe, and an attachment mechanism for engaging the compatible attachment mechanism of the proximal end of the tube nut. The clamp member defines a bore to receive a length of the fuel pipe and is deformable under compression from an unstrained (or original) configuration to a strained configuration. In a first state of engagement, (e.g. when the components are first brought together about the fuel pipe in order to carry out the assembly process) the locking nut and tube nut can initially be axially spaced so as to define a volume therebetween that accommodates the clamp member in its unstrained configuration and the fuel pipe is able to move laterally within the tube nut, including within the region/length surrounded by the clamp member. In a second state of engagement (in which the fuel pipe is secured into position), the locking nut and tube nut are brought together (by way of their cooperative attachment means) such that the clamp member is compressed between the locking nut and tube nut into a strained (or deformed) configuration in which the fuel pipe is unable to move laterally in the region surrounded by the clamp member. Accordingly, the fuel pipe assembly of the invention is arranged to provide a path of fluid communication between a high pressure fuel supply (such as a fuel pump or accumulator volume) and a fuel injector.

In other words, in the first state of engagement or assembly the locking nut and tube nut are arranged such that there is an axial distance between opposing mating surfaces that is at least as wide as the width of the clamp member so as not to overly restrict its lateral and optionally axial movement. Beneficially, the radial clearance between the surface of the bore of the clamp member and the outer surface of the fuel pipe is sufficiently small (close) such that the fuel pipe and clamp member move essentially in unison at the point of contact. In reaching this second state of engagement, however, the clamp member deforms/yields to conform to the surface contours of the opposing mating surfaces of the tube nut and locking nut, and once in the second state of engagement the clamp member is unable to move independently of the tube nut and locking nut. In some embodiments, the clamp member may also be deformed radially inwards by a relatively small amount so as to clamp down even more tightly about the outer surface of the fuel pipe, but without damaging the pipe or constricting the fuel passage through the pipe. Accordingly, in this second state of engagement the close fit of the clamp member with the fuel pipe means that lateral/radial (and axial) movement of the fuel pipe is greatly restricted or constrained at the point or region encircled by the clamp member, and thus the fuel pipe is secured, anchored or clamped within and between the tube nut and locking nut. Beneficially, lateral movement of the fuel pipe is essentially eliminated or prevented in the axial region surrounded by the clamp member, since any clearance that may exist between the fuel pipe and the compressed (strained) clamp member is minimal.

Advantageously, because the fuel pipe is constrained (laterally and axially) by the clamp member, the bores of the tube nut and locking nut have larger diameters than the bore of the clamp member so that the fuel pipe is relatively unconstrained along the length of the tube nut and locking nut either side of the clamp member, in order to allow the fuel pipe to flex and move during assembly of the fuel line. For example, the diametric clearance between the bores of the tube nut or locking nut and the fuel pipe may be in the range of about 0.25 mm to about 7 mm; such as about 0.5 mm to about 6 mm; or about 1 mm to about 5 mm. More suitably, the clearance is between about 2 mm and about 5 mm or between about 3 mm and about 4 mm.

The invention thus provides the significant benefit that the fuel pipe is relatively unconstrained during assembly of the fuel supply line in the engine, because once the tube nut, clamp member and locking nut have been put loosely into position around the fuel pipe, it is not necessary to tighten or lock the components until after the hydraulic connections in the engine have been correctly made. This allows the hydraulic connections within the engine, specifically from the source of high-pressure fuel (e.g. fuel pump or accumulator volume/common rail) to the fuel injector, to be aligned and connected before the position and orientation of the high pressure (HP) fuel pipe is fixed, and thus allows what flexibility there is in the fuel pipe to be used to accommodate machining and manufacturing tolerances. By contrast, in the prior art apparatus the tube nut is a tight fit with the fuel pipe—particularly in the region of the hydraulic seals—and this greatly constrains the fuel pipe. Since an HP fuel pipe is relatively thick and rigid, the constraint of the fuel pipe by the tube nut before it is assembled with the cylinder head and injector can prevent the fuel pipe flexing to adopt an optimal alignment to enable the hydraulic connections to be made without applying high forces during fitting and without inducing high stresses in the pipes or connections after fitting, such as while connecting the fuel pipe to the injector. In turn, this can make it difficult or impossible to form an adequate fuel tight seal between the injector and fuel pipe, and in some cases increased wear of components and premature failure of the fuel supply line can result.

Conveniently, the clamp member (or means) is a separate component of the securing arrangement. However, the skilled person will appreciate how in other embodiments it may be an integral part of the locking nut. Beneficially, the clamp member further comprises a sealing member (or means)/function. For example, the sealing member may be a dust seal, lip seal, partial or one-way seal, or a two-way fluid seal.

Suitably the clamp member comprises a plastically deformable member. The plastically deformable member may be formed from a soft metal or metal alloy (e.g. aluminium, gold, copper, zinc) or a plastics material. Suitably, the deformable member is sufficiently ductile that it does not break under the compressive force necessary to generate the required deformation. The deformable member is suitably a relatively inert material which does not readily corrode or degrade under engine conditions. A preferred material for the deformable member is aluminium. The clamp member may be a disposable component, which is discarded and replaced on disassembly of the fuel pipe assembly. Alternatively, in an embodiment where the clamp member is fitted before the fuel pipe ends are formed, the clamp member would be renewed if and when the fuel pipe is replaced.

Optionally the clamp member comprises a plastically deformable member in combination with an elastically deformable member. In this way, the clamp member provides the dual functions of: sealing the gap between the fuel pipe and the tube nut to prevent fuel (or oil) leakage past the fuel pipe; and clamping the fuel pipe to prevent unwanted vibrations or resonance in the fuel pipe, particularly when the engine is in use. The elastically deformable member is suitably a polymeric material such as rubber or a synthetic polymer.

In one suitable embodiment, the plastically deformable member comprises an annular band (or disc or ring), and the elastically deformable member comprises a resilient annular seal (such as an O-ring or other suitable seal), which may conveniently be carried by the annular band. Advantageously, the plastically deformable member is provided with an annular channel (or groove) on its radially inner (i.e. bore-facing) surface into which the plastically deformable member (e.g. a resilient annular seal) is received. Conveniently, the annular band has a U-shaped cross-section into which the elastically deformable member is located. In some embodiments it is beneficial to hydraulically seal the fuel pipe against fuel leaks at a pressure of up to about 10 bar (e.g. typically around 6 bar), which might be experienced by a fuel pipe assembly that connects to an injector within the fuel zone. A typical O-ring seal may be appropriate for use as the elastically deformable member in such applications. In other cases, such as when the fuel pipe and injector connection is made in the oil/lubrication zone of the engine, a hydraulic seal may not be important, or it may only be necessary to seal against oil at lower pressures, such as up to about 2 bar (e.g. around 1 bar). Therefore, the elastically deformable member may be a lip seal, shield or O-ring.

In some embodiments, the proximal end of the tube nut is provided with an enlarged bore that is coaxially aligned with the through-bore of the tube nut. The enlarged bore is arranged to receive at least a portion of the locking nut. Conveniently, the attachment mechanism (or means) for engaging the locking nut with the tube nut comprises an internal (or female) screw-thread over at least part of the inner surface of the enlarged bore of the tube nut and a compatible external (or male) screw-thread provided over at least a portion of the outer surface of the locking nut. As previously indicated, the tube nut and locking nut are adapted such that when initially brought into contact with each other, for example, prior to engagement of their respective attachment means (e.g. screw-threads), a volume is defined therebetween, which is large enough to accommodate the clamp member or means in its unstrained (original) configuration. However, as the locking nut and tube nut are engaged with each other (e.g. by rotating the locking nut about the screw-thread), the axial distance (and hence the volume) between the two components reduces and the clamp member or means is compressed into a strained (deformed) configuration. Compression of the clamp member may continue until the tube nut and locking nut are fully engaged or until the components are suitably engaged and the compressed clamp member prevents closer association of the components. Compression of the clamp member may to some extent also reduce the radial clearance between the clamp member and the fuel pipe (relative to the clearance in the unstrained configuration), which may further enhance the clamping action on the sides of the fuel pipe. The compression of the clamp member between the locking nut and tube nut essentially prevents axial and lateral movement of the clamp member and, thus, of the fuel pipe.

In a beneficial embodiment the fuel pipe assembly is adapted to be received within a bore (e.g. a transverse bore) in the cylinder head. The transverse bore intersects with the injector pocket (or bore) provided in the cylinder head for receiving the fuel injector (or at least the injection nozzle). In this way, the head of the fuel pipe can be suitably located to engage the fuel injector within the cylinder. Suitably, the tube nut is provided with an attachment mechanism for engaging a compatible attachment mechanism of the cylinder head. Advantageously, the attachment mechanism for engaging the tube nut with the cylinder head comprises an external screw-thread over at least a portion of the outer surface of the proximal end of the tube nut, and a compatible internal screw-thread over at least a portion of the bore within which the tube nut is received. In use, correct engagement of the tube nut with the cylinder head generates a compressive force between the head (or distal end) of the fuel pipe and the associated seating surface of the injector, to create a substantially fluid tight seal between the fuel pipe and injector and prevent the leak of high pressure fuel between the interface. Suitably, the tube nut is provided with a thrust surface (at or towards its distal end) to exert an axial load onto the head of the fuel pipe in order to compress the end of the fuel pipe against the cooperating surface of the injector.

Typically, the distal end (or head) of the fuel pipe is provided with a male frusto-conical (or part-spherical) surface for cooperation with a female frusto-conical or part-spherical seating surface of the fuel injector. At least one part-spherical surface in the seating interface is advantageous to permit a degree of articulation between the fuel pipe and the injector at the interface of the cooperating surfaces. In this way, any inaccuracies in the machining of the fuel pipe and/or the injector may be compensated by the tolerance in the cooperation between the respective seating surfaces.

The tube nut may be adapted such that substantially its whole length is received within the bore of the cylinder head so as to reduce the size of components extending from the cylinder head into the crowded engine space. In some embodiments, the locking nut is at least in part received within the envelope of the cylinder head, and in some embodiments the locking nut is substantially received within the bore of the cylinder head. Advantageously, the fuel pipe assembly may be adapted to be of such a length that the tube nut and the locking nut, when assembled, are fully received within the fuel pipe passage (or bore) of the cylinder head, such that none of the assembly (other than the fuel pipe itself) protrudes from the cylinder head into the engine space.

Beneficially, the tube nut carries an annular seal member, for example, in the form of a resilient rubber ring, arranged to form a substantially fluid tight seal between the tube nut and an opposing surface (e.g. bore) of the cylinder head so as to prevent leakage of fuel and/or oil therethrough. The seal may, for example, be effective up to about 10 bar. The tube nut may be provided with an external annular (circumferential) groove in which the seal member can be located. Conveniently, the annular seal member is provided on the proximal end (or region) of the tube nut.

In an alternative arrangement, the fuel pipe assembly is adapted to mount externally of the cylinder head so as to engage the fuel injector at a point outside the cylinder head, and hence outside the injector pocket. For example, the fuel pipe assembly may be mounted to a side or top of the cylinder head, for example, via a flange or skirt attached to the side of the cylinder head. In such an embodiment, the tube nut is suitably provided with an attachment mechanism for engaging a compatible attachment mechanism of the fuel injector. For example, the distal end of the tube nut may be provided with an enlarged bore (coaxial with the through-bore of the tube nut) for receiving a limb (or protrusion) provided on the fuel injector. The enlarged distal bore of the tube nut is conveniently provided with an internal screw-thread over at least an axial portion/part of the (inner) surface of the enlarged bore, which in use cooperates with a compatible external screw-thread provided over at least a portion of the limb of the fuel injector. As in the above embodiments, the tube nut is beneficially provided with a thrust surface (at or towards its distal end) to exert an axial load onto the head of the fuel pipe in order to compress it against the cooperating surface of the injector. Thus, the injector seating surface may be provided on an end face of the limb. In this embodiment, on engaging the tube nut with the injector an axial load is transmitted through the head of the fuel pipe and onto the corresponding seating surface of the injector, such that a substantially fluid tight seal is created between the fuel pipe and the injector.

The invention further provides a clamp member (or clamping device) for use in a fuel supply line for supplying fuel to a fuel injector. The clamp member is deformable from a first unstrained conformation to a second strained (or deformed) conformation, when compressed between a tube nut and a compatible/corresponding locking nut of the fuel supply line.

The clamp member suitably serves the purpose of clamping the fuel pipe at the interface of a tube nut and a locking nut (i.e. towards the proximal end of the tube nut), to inhibit or prevent lateral (and axial) movement of the fuel pipe. Thus, unwanted vibrations and/or resonance along the section of fuel pipe within the tube nut are inhibited. The clamp member may further serve the purpose of sealing the gap between the fuel pipe and tube nut to prevent the escape of fuel or oil into the engine, especially where used in a fuel supply line that connects to the injector within the cylinder head, where it is important to prevent escape of fuel to the environment outside the engine. On the other hand, in embodiments where the fuel supply line is connected to the injector above the cylinder head it can be beneficial to prevent the ingress of dust, dirt or liquids (such as water) in the opposite direction (i.e. entering the space between the pipe and tube nut). However, in these embodiments, it may be beneficial to allow any fuel that leaks from the high pressure hydraulic connection to be able to pass to the outside environment of the engine, so as to act as a visible indication of a fault or leak. This precaution may make it possible to avoid fuel pressure (from a leak) building up within the tube nut and causing structural failure or leaking into the engine oil, which may then cause engine seizure. Hence, in embodiments where the fuel line is adapted to connect above the cylinder head, the clamp member, and particularly the elastically deformable member, may comprise a one-way fluid seal (to allow fluids to escape out but not into the assembly), or may provide a partial seal (e.g. a shield). Alternatively a leak path (such as a channel or bore) may be provided in or around the clamp member to allow the escape of liquid.

The clamp member typically comprises a plastically deformable member, such as an annular band arranged to restrict lateral movement of a fuel pipe and act as a clamp; and an elastically deformable member, such as a resilient annular seal, to act as a seal. Advantageously, the clamp member, and particularly the annular band, is a close/clearance fit with the fuel pipe for which it is adapted to associate. For example, the bore may have a diameter up to about 1 mm wider than the fuel pipe, suitably up to about 0.5 mm, and more suitably up to about 0.2 mm. To enable assembly there may be a minimum clearance between the bore and the pipe of e.g. about 0.05 mm.

The clamp member of this aspect of the invention may have any of the features described in relation to the first and other aspects of the invention described herein. Likewise, it will be understood that any features of the clamp member described in relation to this aspect of the invention are to be considered as incorporated into any other aspect of the invention.

In another aspect the invention provides a fuel supply line arrangement for an engine, comprising a fuel pipe and a fuel pipe assembly as described in relation to the first aspect of the invention (and elsewhere herein).

The invention also provides an internal combustion engine having a fuel pipe assembly and/or a clamp member according to the invention therein.

The invention further provides methods for assembling a fuel pipe assembly and/or fuel supply line to a fuel injector using the clamp member of the invention to clamp and/or seal the outer surface of the fuel pipe.

In one embodiment there is provided a method for securing a fuel pipe to a fuel injector of an engine, wherein the fuel injector is located within a bore of an engine cylinder head. The method comprises: providing a tube nut for connecting the fuel pipe to the fuel injector, the tube nut comprising a tubular member defining an axial bore therethrough to receive a length of the fuel pipe, a distal end shaped for cooperation with the head of the fuel pipe, and a proximal end having an attachment mechanism for engaging a compatible attachment mechanism of a locking nut; providing a locking nut having an axial bore to receive a length of the fuel pipe, and an attachment mechanism for engaging the compatible attachment mechanism of the proximal end of the tube nut; and providing a clamp member, the clamp member defining a bore to receive a length of the fuel pipe and being deformable under compression from an unstrained configuration to a strained configuration. The method further comprises the steps of: fitting the tube nut, clamp member and locking nut over the fuel pipe, such that the distal end of the tube nut abuts the head of the fuel pipe and the clamp member is located about the fuel pipe between the tube nut and the locking nut; maintaining the locking nut and tube nut in a first state of engagement wherein an axial distance/volume is defined therebetween that accommodates the clamp member in its unstrained configuration such that the fuel pipe is able to move laterally while the supply line is assembled to form a substantially fluid tight seal between the head of the fuel pipe and the fuel injector; and thereafter engaging the locking nut with the tube nut so as to create a second state of engagement in which the clamp member is compressed/deformed into a strained configuration between the locking nut and tube nut, whereby lateral (and axial) movement of the fuel pipe is prevented. The methods of the invention may involve any method steps corresponding to the use of any components and features described in relation to the apparatus aspects of the invention.

These and other aspects, objects and the benefits of this invention will become clear and apparent on studying the details of this invention and the appended claims.

BRIEF DESCRIPTION OF THE DRAWINGS

The invention will further be described, by way of example, with reference to the accompanying drawings, in which.

DETAILED DESCRIPTION OF THE PREFERRED EMBODIMENTS

Figure 1:
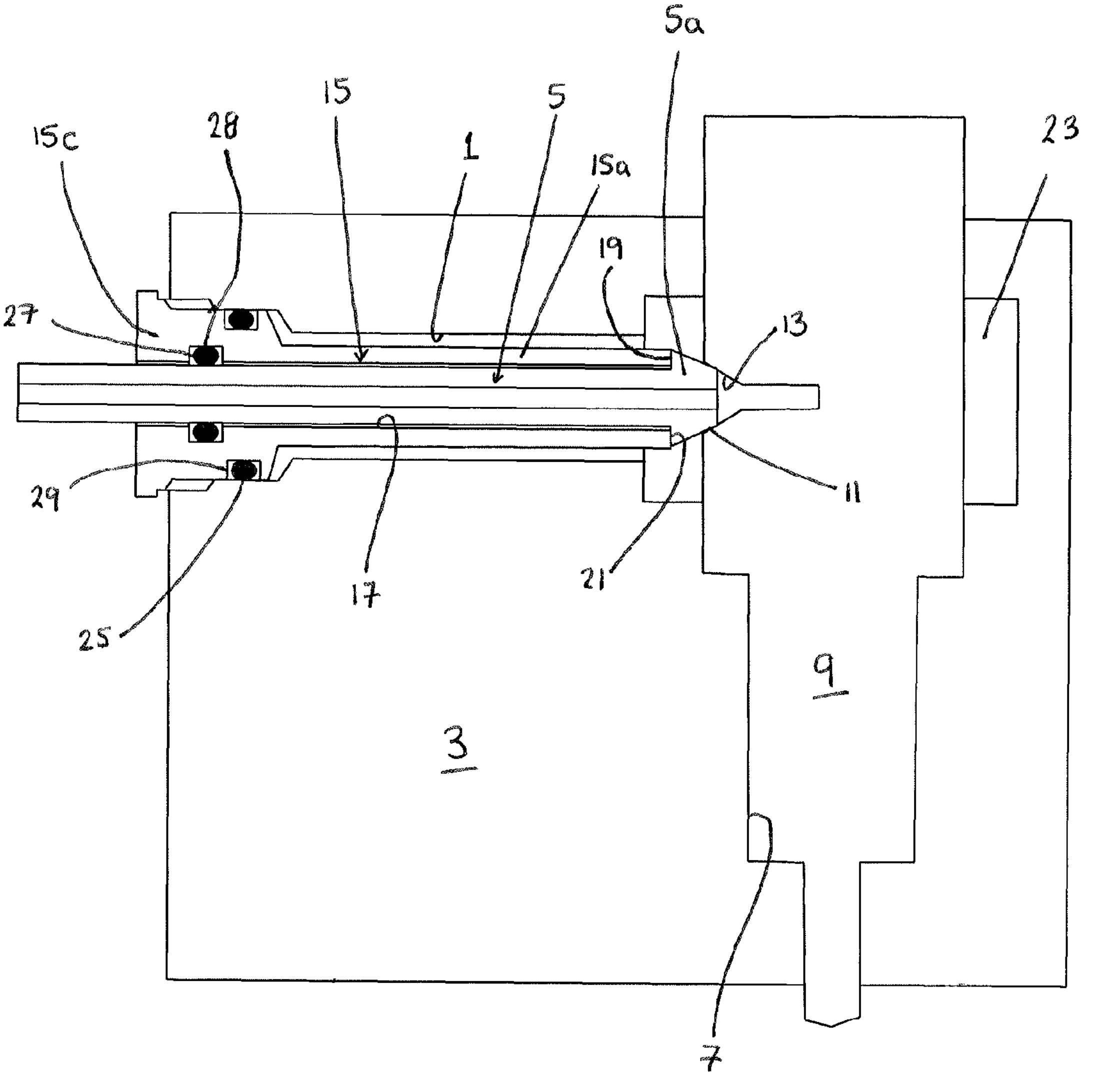
FIG. 1 is a sectional view illustrating a first arrangement of a fuel pipe assembly of the prior art, in which the fuel pipe and fuel injector engage within the cylinder head.

With reference to FIG. 1, in a prior art arrangement, a fuel pipe passage in the form of a transverse bore 1, within which a high pressure (HP) fuel pipe 5 is disposed, extends through cylinder head 3 to intersect with a bore (or "injector pocket") 7 in which an injection nozzle 9 is housed. The distal end (or head) 5*a* of the fuel pipe 5 is provided with a male conical surface 11, which seals against a lateral seating face 13 on the body of the injection nozzle 9 when it is clamped in place by means of a tube nut 15. The tube nut 15 is adapted to be received within the bore 1 and has an elongate tubular region 15*a* at the injector (or distal) end and a radially enlarged region at its proximal end 15*c* to cooperate with an enlarged region of the transverse bore 1 at the outer surface of the cylinder head 3.

The tube nut 15 is provided with an axial through-bore 17 which receives the fuel pipe 5. The tube nut 15 has an axial length of substantially the length of the transverse bore 1. The head 5*a* of the fuel pipe 5 is radially enlarged relative to the tubular section of the fuel pipe 5 so that a proximal-facing radially extended flange (or surface) 19 is formed, against which the distal end surface 21 of the tube nut 15 abuts.

The tube nut 15 is provided at its proximal end 15*c* with an external screw thread that cooperates with an internal screw thread provided in the enlarged outer region of the transverse bore 1 of the cylinder head 3. In use, to firmly seal the fuel pipe 5 to the injection nozzle 9, the external screw-thread of the tube nut 15 is engaged with the internal screw-thread of the cylinder head 3 and the tube nut 15 is rotated to tighten it into place within the transverse bore 1. During this process, the end surface 21 of the tube nut 15 exerts an axial load on the head 5*a* of the fuel pipe 5 (through the flange 19), such that a sealing engagement is formed between the conical sealing surface 11 of the fuel pipe 5 and the lateral seating face 13 of the injection nozzle 9. The lateral seating face 13 of the injection nozzle 9 may be of female frustoconical or part-spherical form for engagement with the conical surface 11 of the fuel pipe 5. A part-spherical form may help to accommodate manufacturing tolerances between different components.

In this arrangement it is necessary to externally seal the fuel pipe 5 to prevent fuel leakage from the fuel zone 23. To this end, the apparatus includes seals 25, 27. O-ring seal 25 is housed in a circumferential channel (or groove) 29 provided in the proximal end 15*c* of the tube nut 15, to seal and prevent fuel leakage between the outer surface of the tube nut 15 and the (inner) surface of the transverse bore 1. Meanwhile, seal 27 is housed within a radial groove (or channel) 28 in the surface of the through-bore 17 of the tube nut 15, so as to seal and prevent fuel leakage between the (inner) surface of the bore 17 and the outer surface of the fuel pipe 5.

To hydraulically connect the fuel supply line of this arrangement the fuel pipe 5 is inserted into the bore 17 of the tube nut 15, such that the thrust surface 21 of the tube nut 15 abuts (or is at least proximal to) the opposing face (or radially extended flange) 19 of the head 5*a* of the fuel pipe 5. At this stage the tube nut 15 and seal 27 firmly constrain the pipe nut 5 as the necessary fluid-tight seal between the fuel pipe 5 and tube nut 15 is formed and the diametric clearance between the bore 17 and the fuel pipe 5 is only approximately 0.2 mm. Next the tube nut 15 carrying the fuel pipe 5 is inserted into the transverse bore 1 of the cylinder head 3 until the seating surface 11 of the fuel pipe 5 contacts the opposing seating surface 13 of the injection nozzle 9 and/or until the external screw-thread on the outer surface of the proximal end 15*c* of the tube nut 15 begins to engage the internal screw-thread of the enlarged opening of the transverse bore 1. To hydraulically connect the fuel pipe 5 to the injection nozzle 9 and form the high pressure seal, the tube nut 15 is rotated against the screw-threads to tighten the tube nut 15 into the bore 1 and thereby exert an axial load through the head 5*a* of the fuel pipe 5 onto the seating surface 13 of the injection nozzle 9.

A first embodiment of the invention will now be described with reference to FIGS. 2 and 3, in which same reference numerals are used to denote equivalent parts. The fuel pipe assembly of the invention is arranged to connect a fuel pipe 5 to an injection nozzle 9 within a cylinder head 3 of an engine. As before, the distal end (or head) 5*a* of the fuel pipe 5 is provided with a male conical surface 11, which seals against a lateral seating face 13 on the body of the injection nozzle 9 when it is clamped in place by means of a tube nut 115. The tube nut 115 defines an axial through-bore 17, through which the fuel pipe is received, and includes a tubular member 115*a*, a distal end (or region) 115*b* shaped for cooperation with the head 5*a* of the fuel pipe 5, and a proximal end (or region) 115*c* that is shaped for cooperation with a locking nut 70.

The proximal end 115*c* of the tube nut 115 is adapted for engagement with the transverse bore 1 of the cylinder head 3 as previously described, so as to generate an axial load through the head 5*a* of the fuel pipe 5 in order to form a fluid-tight seal between fuel pipe 5 and the injection nozzle 9, in use. In addition, the proximal end 115*c* is provided with an enlarged bore region 17*c* coaxial with bore 17 for receiving a section of the locking nut 70 and also a clamp member 80. At the junction of the enlarged bore 17*c* and bore 17 the inner wall of the tube nut 115 defines a step 117, which as depicted is approximately perpendicular (i.e. at approx. 90°) to the axis of the bore. However, an oblique step is also possible.

To engage the locking nut 70 within the proximal end 115*c* of the tube nut 115, the enlarged bore 17*c* is provided with an internal screw-thread over at least a portion of its surface, which is compatible with an external screw-thread provided over at least a portion of the outer surface of the locking nut 70.

Figure 3:
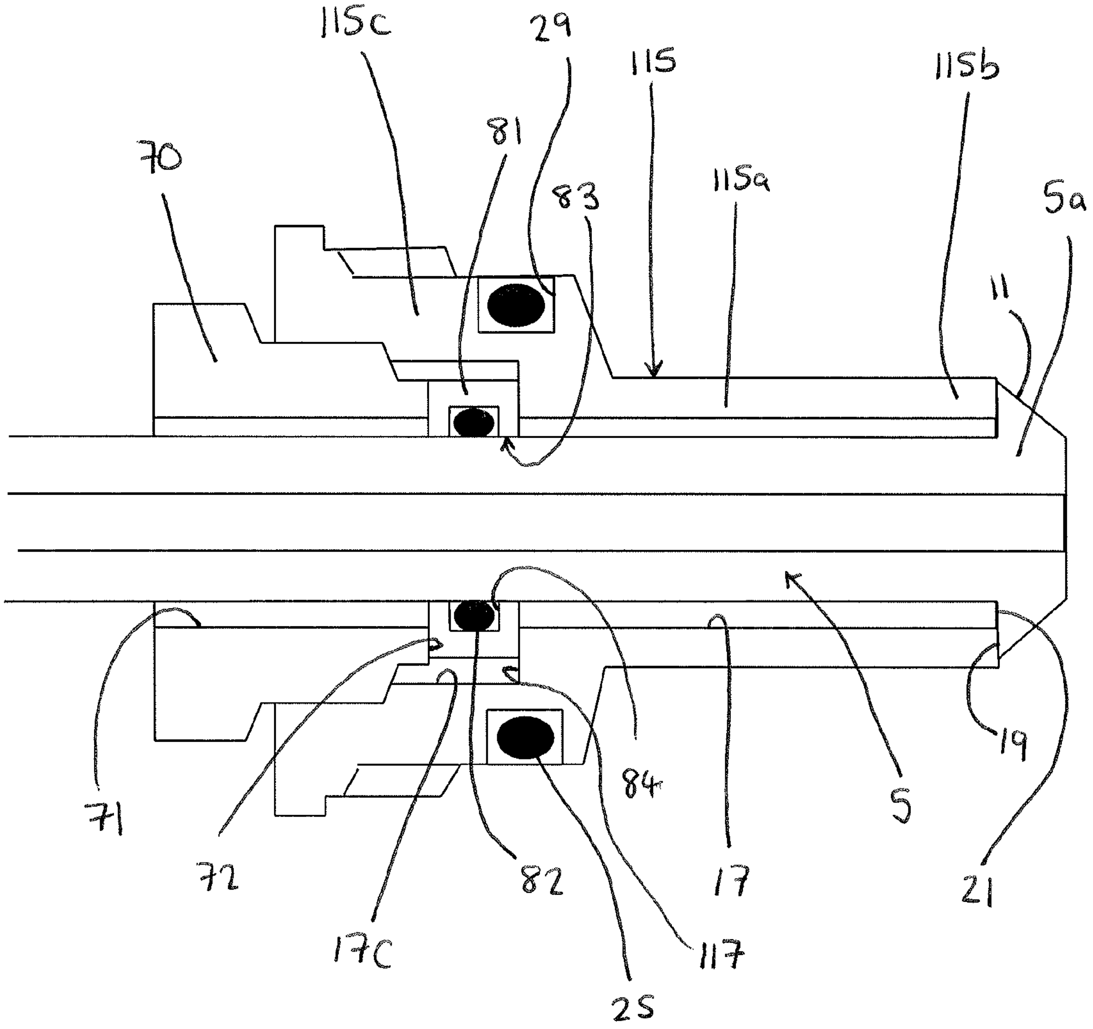
FIG. 3 is an enlarged sectional view of the embodiment of FIG. 2, showing the interaction between the clamp member of the invention and components of the fuel pipe assembly.

As shown in FIG. 3, the clamp (and sealing) means 80 comprises an annular band 81, which holds a resilient annular seal 82 (e.g. in the form or a resilient rubber ring or O-ring). The annular band (or ring) 81 defines a bore (or opening) 83, which is sized to fit around the outer surface of the fuel pipe 5 and to be a close fit therewith. For example, the diametric distance between the surface of the bore 83 and fuel pipe 5 may be approximately 0.2 mm, so as to prevent extrusion of the seal 82. The inner surface of the annular band 81 defines a channel (or groove) 84 into which the annular seal 82 is located. Typically, the annular band 81 is made of a plastically deformable material such as aluminium or a similarly soft metal or alloy.

The locking nut 70 is also provided with an axial bore 71 through which the fuel pipe 5 can be received. As with the bore 17, there is a clearance between the wall of the bore 71 and the outer surface of the fuel pipe 5, which allows the fuel pipe 5 a degree of lateral movement and flexibility. At least the tube nut-engaging region of the locking nut 70 has a generally cylindrical shape to allow it to fit neatly into the enlarged bore 17*c* of the tube nut, and contains an attachment mechanism (or system) in the form of an external screw-thread for engaging the compatible internal screw thread of the tube nut 115.

As before, to externally seal the fuel pipe 5 to prevent fuel leakage from the fuel zone 23, a seal 25 is housed in a circumferential channel (or groove) 29 provided in the proximal end 115*c* of the tube nut 115, to seal and prevent fuel leakage between the outer surface of the tube nut 115 and the (inner) surface of the transverse bore 1. It is self-evident that the fluid seal 27 in the prior art apparatus of FIG. 1 is replaced in this embodiment by seal 82.

To assemble and hydraulically connect the fuel supply line in this embodiment, the tube nut 115, clamp member 80 (comprising annular band 81 carrying annular seal 82) and locking nut 70 are placed over the fuel pipe. The tube nut 115 is located with its distal end 115*b* abutting or close to the head 5*a* of the fuel pipe 5, so that the thrust surface 21 of the tube nut 115 opposes surface (or flange) 19 at the back of head 5*a*. The annular band 81 carrying annular seal 82 and the locking nut 70 are positioned at the proximal end 115*c* of the tube nut 115, within the enlarged bore region 17*c*, such that the distal side of the annular band 81 (i.e. the side wall nearest the injection nozzle 9 and fuel pipe head 5*a*) opposes the step 117, and the distal end of the locking nut 70 opposes the proximal side of the annular band 81. The locking nut 70 may be close to or abut the proximal end 115*c* of the tube nut 115 while the hydraulic connections between, for example, the pipe nut 5 and injection nozzle 9 are created. In this state, the axial distance between the distal wall 72 of the locking nut 70 and the step 117 of the tube nut 115 is sufficiently large that the annular band 81 is uncompressed or unstrained and sits (loosely) between the surfaces 72 and 117 such that lateral movement of the fuel pipe 5 and annular band 81 is possible. The loose assembly of the fuel pipe 5, tube nut 115, clamp member 80 and locking nut 70 is inserted into the transverse bore 1 of the cylinder head 3, until the seating surface 11 of the fuel pipe head 5*a* contacts the opposing seating surface 13 of the injection nozzle 9 and/or until the external screw-thread on the outer surface of the proximal end 115*c* of the tube nut 115 begins to engage the internal screw-thread of the enlarged opening of the transverse bore 1. To hydraulically connect the fuel pipe 5 to the injection nozzle 9 and form a high pressure seal, the tube nut 115 is rotated against the screw-threads to wind the tube nut 115 into the bore 1 and thereby to exert an axial load from the distal end 115*b* of the tube nut 115, through the head 5*a* of the fuel pipe 5 and onto the seating surface 11 of the injection nozzle 9. In this loose configuration, the fuel pipe 5 is able to flex and move laterally within the bores 17 and 71 so that the head 5*a* (and particularly the seating surface 11 of the head 5*a*) can adjust its position to sit comfortably against the seating surface 13 of the injection nozzle 9 while it is being forced into place. In this way an optimal fluid-tight seal is formed between the mating surfaces 11 and 13, and undesirable strain is not placed on the fuel pipe 5 (to conform to an non-optimal configuration), or on any other component of the fuel supply line. Since the annular band 81 fits snugly around the fuel pipe 5 but is loosely located within the volume defined between the locking nut 70 and the tube nut 115, it can move with the fuel pipe 5 as it adjusts its position.

Once the tube nut 115 has been tightened into the transverse bore 1 (e.g. it is fully engaged) and a fluid-tight seal has been formed between the seating surfaces 11 and 13 (i.e. between the fuel pipe 5 and injection nozzle 9), the locking nut 70 is then screwed into the proximal end 115*c* of the tube nut 115 so as to secure the fuel pipe 5 and the other components into position. As previously indicated, by screwing the locking nut 70 into the enlarged bore 17*c* of the tube nut 115, the axial distance and the volume between the locking nut 70 and tube nut 115 reduces and compresses the annular band 81 carrying the annular seal 82. Compression of the annular band 81 causes the component to be moulded and clamped between the distal surface 72 of the locking nut 70 and the step 117 of the tube nut 115, either until the locking nut 70 is fully engaged with the tube nut 115 or the clamp member 80 does not allow any further compression. In this second state of engagement, the clamp member 80 is deformed and held between the opposing surfaces of the locking nut 70 and tube nut 115 and provides a clamping effect around the fuel pipe 5, which constrains (anchors or locks) the fuel pipe at this axial position. The constraining of the fuel pipe 5 provides the benefit of inhibiting vibrations and resonance of the pipe 5, and the annular seal 82 prevents fuel leaks around the fuel pipe 5. In this state there may be a small clearance between (part of) the inner surface of the annular band 81 and the outer surface of the fuel pipe 5 (which amongst other things avoids damage to the fuel pipe), but any minor amount of clearance is insufficient to allow the pipe 5 to vibrate/resonate in a way that could damage the assembly or connections.

Figure 4:
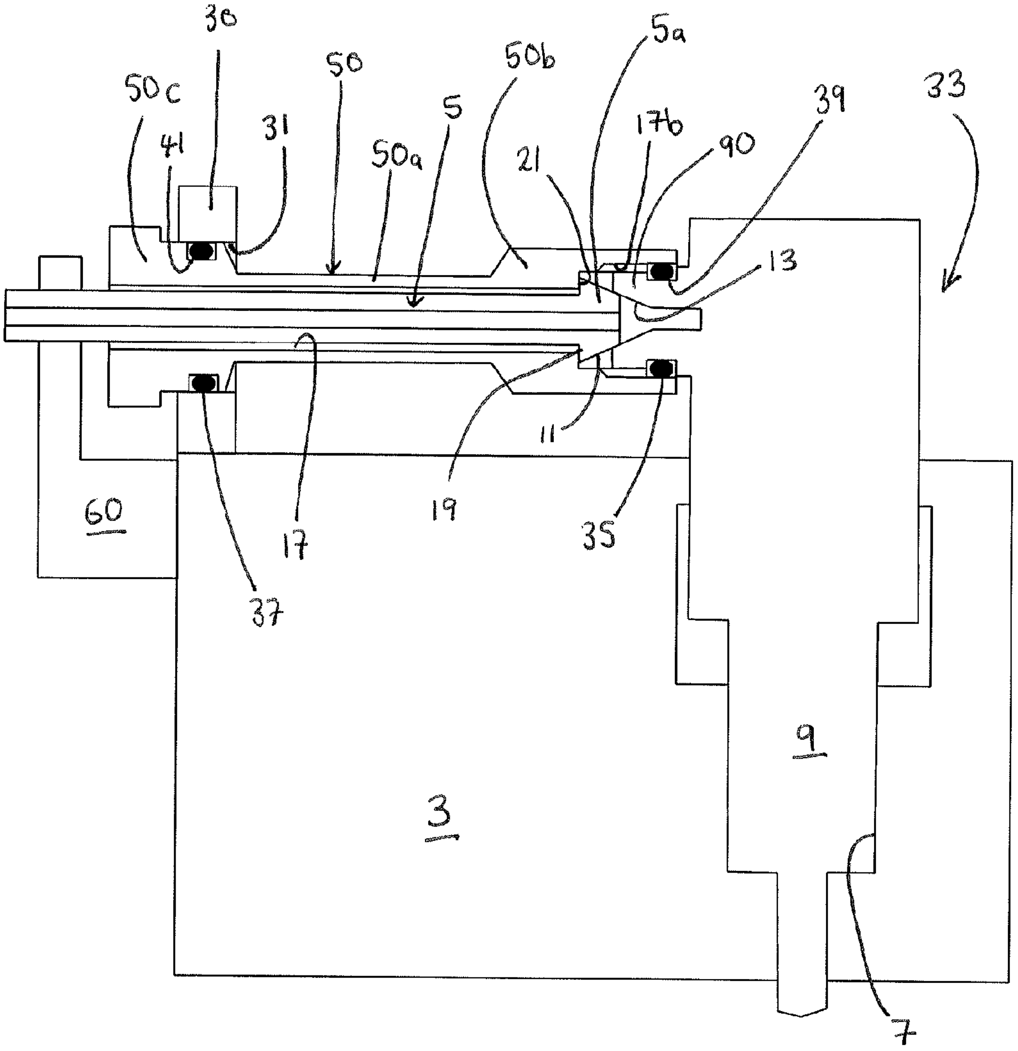
FIG. 4 is a sectional view illustrating a second arrangement of a fuel pipe assembly of the prior art, in which the fuel pipe and fuel injector engage outside the cylinder head.

A second arrangement known in the prior art will now be described by reference to FIG. 4, in which like parts are denoted by the same reference numerals used above. In this arrangement, the cylinder head 3 does not require a transverse bore to allow the fuel pipe 5 to engage with the injection nozzle 9 because the fuel pipe 5 is mounted outside of the cylinder head 3 and engages with a corresponding region of the injector 9 outside of the cylinder head 3.

As shown, an injector 9 is partially housed within an injector pocket (or bore) 7, such that an upper region of the injector 9 extends above the cylinder head 3. The upper region of the injector 9 includes the lateral seating face 13 against which the male conical (or part-spherical) surface 11 of the distal end 5*a* of the HP fuel pipe 5 seals when it is clamped in place by means of the tube nut 50.

The tube nut 50 has a central elongate tubular region 50*a*, which is flanked at the injector (or distal) end by a radially enlarged region 50*b* adapted to engage with the injector 9, and at its proximal end with a radially enlarged region 50*c* adapted to cooperate with an extension (e.g. a plate or skirt) 30 of the cylinder head 3, which extends parallel to the axis of the injector 9. Skirt 30 is typically formed as a separate component (and of a different material) to the cylinder head (e.g. aluminium or steel) and is attached to the side of the cylinder head 3. The skirt 30 is provided with a through-bore 31 which is adapted to receive and to be a close (e.g. clearance) fit with the outer surface of the region 50*c* of the tube nut 50. As before, the tube nut 50 is provided with an axial through-bore 17 which receives the fuel pipe 5.

In the depicted arrangement, the injector 9 is provided with a limb 90 (conveniently of cylindrical form), at the end face of which is formed the lateral seating face 13 for cooperating with the seating surface 11 of the fuel pipe 5. For engagement with the limb 90 of the injector 9, the bore 17 through region 50*b* of the tube nut 50 has a radially enlarged portion 17*b* at least at the most distal end (i.e. which in use is adjacent to the injector 9). The enlarged bore 17*b* is sized both to accommodate the head 5*a* of the fuel pipe 5, and to be a close fit with the outer circumference of the cylindrical limb 90 of the injector 9. At least a portion of the surface of the enlarged bore 17*b* has an internal screw-thread and for engagement with the injector 9, the limb 90 is provided with a compatible external screw-thread over at least a portion of its cylindrical surface. In this arrangement, the change in radius at the junction of bores 17 and 17*b* creates a distal-facing step that defines a thrust surface 21. In a similar manner to the apparatus of FIGS. 1 to 3, on assembly of the fuel pipe assembly, thrust surface 21 of the tube nut 50 abuts the radially extended flange 19 at the distal end 5*a* of the fuel pipe 5. An external clamp 60 is mounted to the side of the cylinder head 3 and attaches to the fuel pipe 5 at a position proximal to the tube nut 50.

In this arrangement it is necessary to prevent oil leaking past the tube nut 50 into the engine from the lubrication oil zone 33. To this end, seals 35 and 37 are provided. O-ring seal 35 is housed in a circumferential channel (or groove) 39 provided in the outer surface of limb 90 and forms a seal against the surface of the enlarged bore 17*b* of the tube nut 50 to prevent oil leakage into the region between the tube nut 50 and fuel pipe 5. O-ring seal 37 is similarly housed within a radial groove (or channel) 41 formed in the outer surface of the enlarged end 50*c* of tube nut 50. Seal 39 is located so as to form a seal with the (inner) surface of bore 31 in plate 30 and functions to prevent oil leakage into the engine compartment.

To assemble the fuel supply line in this prior art arrangement so as to create a fuel path from the source of high-pressure fuel to the injector, the fuel pipe 5 is first inserted into the tube nut 50 with the head 5*a* of the fuel pipe 5 located within the enlarged bore 17*b* of the distal end 50*b* of the tube nut 50. The tube nut 50 and fuel pipe 5 together are then passed through bore 31 in skirt 30 until the distal end 50*b* is brought into contact with limb 90 of the injector 9 and the proximal end 50*c* of the tube nut 50 sits within the bore 31 of skirt 30. Although there is no form of attachment between the skirt 30 and the tube nut 50, other than that generated by the clearance (or frictional) fit of the two components, it will be appreciated that other forms of attachment may also or alternatively be used to associate the tube nut 50 with the cylinder head 3. To hydraulically connect the fuel pipe 5 with the injector and to form a high pressure seal between the respective seating surfaces 11 and 13 of the fuel pipe 5 and injector 9, respectively, the enlarged end 50*b* of the tube nut 50 is placed over the limb 90 so as to engage the respective screw-threaded regions, and the tube nut 50 is rotated appropriately to tighten the tube nut 50 into place. As the tube nut 50 is drawn towards the injector 9 by action of the screw-threads, the thrust surface 21 of the tube nut 50 exerts an axial load on flange 19 of the fuel pipe 5, such that a sealing engagement is formed between the conical sealing surface 11 of the fuel pipe 5 and the lateral seating face 13 of the injector 9.

Finally in the depicted arrangement, to reduce or prevent resonance or vibrations of the fuel pipe 5 (particularly during engine activity), the clamp 60 is attached to the fuel pipe 5 at a position spaced from the tube nut 50. By connecting a free section of the fuel pipe 5 to a fixed component in the engine, unwanted resonance or vibrations of the fuel pipe 5 are inhibited.

Figure 2:
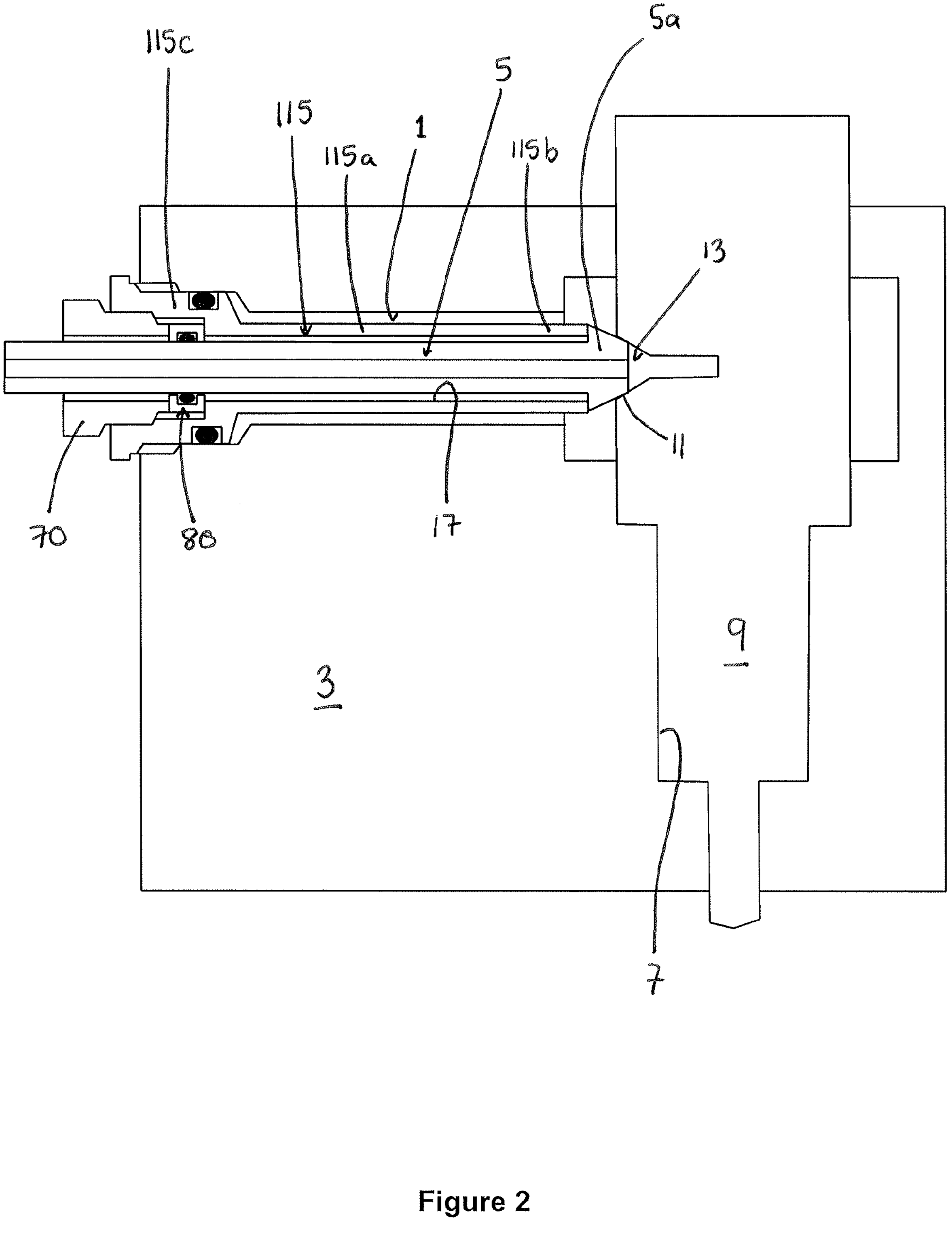
FIG. 2 is a sectional view illustrating a first embodiment of a fuel pipe assembly of the invention, in which the fuel pipe and fuel injector engage within the cylinder head.
Figure 5:
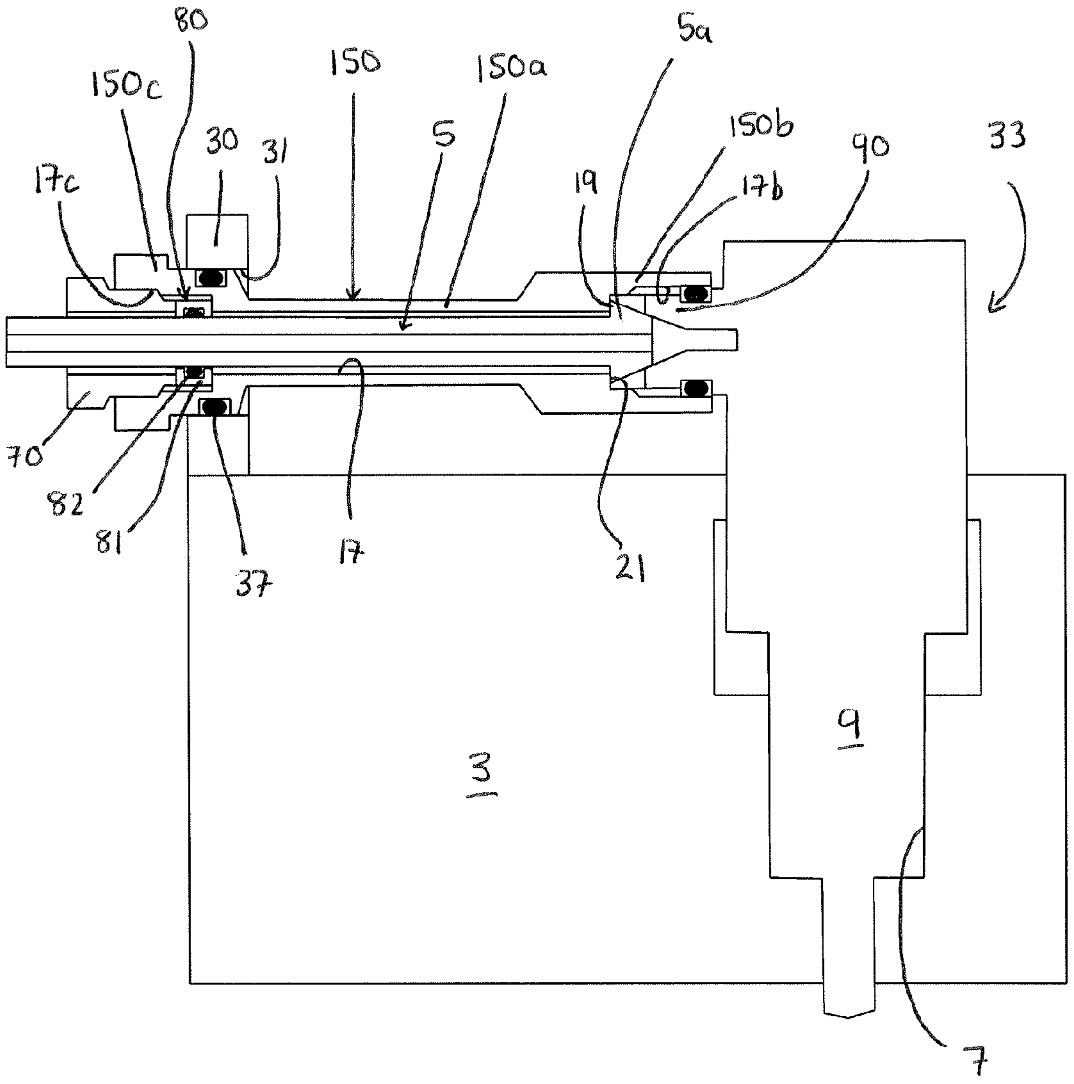
FIG. 5 is a sectional view illustrating a second embodiment of a fuel pipe assembly of the invention, in which the fuel pipe and fuel injector engage outside the cylinder head.

FIG. 5 shows a different embodiment of the invention to the fuel pipe assembly of FIGS. 2 and 3, and like reference numerals are used to identify like parts.

In contrast to the embodiment of FIGS. 2 and 3, the distal end 150*b* of the tube nut 150 is enlarged and defines an enlarged axial bore 17*b* (coaxial with the bore 17) for accommodating the cylindrical limb 90 of the injector 9. The distal end 150*b* of the tube nut 150 and its connections/interactions with the injector 9 and head 5*a* of the fuel pipe 5 are essentially the same as described in relation to FIG. 4 above. Likewise, cooperation between the respective seating surfaces 11 and 13 of the fuel pipe 5 and injector 9 and, in use, creation of the high-pressure seal between the fuel pipe 5 and injector 9 is also as previously described.

The proximal region 150*c* of the tube nut 150, the clamp member 80 and the locking nut 70 are arranged essentially as described in relation to the first embodiment of the invention (see description of FIGS. 2 and 3 above). In addition, the outer surface of the proximal region 150*c* is shaped to be a close (e.g. frictional) fit within the bore 31 of the skirt 30, as described in relation to FIG. 4, so that the fuel passage assembly can be mounted above the cylinder head rather than in a bore therethrough. Furthermore, an external seal 37 (e.g. a resilient elastomeric ring) may be provided to prevent oil leaking past the tube nut 150 into the engine from the lubrication oil zone 33.

To assemble the fuel pipe assembly of this embodiment of the invention, the tube nut 150, clamp member 80, locking nut 70 and fuel pipe are assembled in the same manner as previously described. Hence, the clearance between the bores 17 and 71 allows a degree of lateral (and axial) movement of the fuel pipe 5, but the closer fit of the annular band 81 and seal 82 means that the clamp member 80 tends to move (laterally and/or axially) with the fuel pipe 5. While the locking nut 70, clamp member 80 and tube nut 150 are in the first state of engagement the high pressure seal between the fuel pipe 5 and the injector 9 is formed as described with respect to FIG. 4. Once the hydraulic seals are in place, the locking nut 70 is (fully) engaged with the proximal end 150*c* of the tube nut 150, so as to compress and deform the annular band 81 and to thus secure (or clamp) the fuel pipe 5 at the axial position of the clamp member 80 as described in relation to FIG. 3. Advantageously, by securing the fuel pipe 5 at the interface (junction) of the locking nut 70 and tube nut 150, the fuel pipe 5 is preventing from vibrating or resonating within the assembly, and an external clamp 60 (as required in the prior art) is not required. This simplifies the assembly of the apparatus, as well as reducing the manufacturing burden and cost, and the volume taken up by the apparatus within the engine.

Although the clamp member 80 in this embodiment of the invention is depicted as an annular band 81 carrying a resilient seal 82, since the tube nut is not in the fuel zone (and may rather be exposed to low oil pressure, e.g. approx. 1 bar), in a slight variation to the embodiment of FIG. 5, it may not be necessary to include a resilient (or elastically deformable) ring seal 82 to prevent fluid leakage. Instead, therefore, the clamp member 80 may simply comprise a deformable member (e.g. a plastically deformable member), such as annular band 81, which can be compressed in order to clamp the fuel pipe 5, rather than to clamp and seal around the fuel pipe 5. In yet another variation, the clamp member 80 may comprise a plastically deformable member (such as annular band 81) in combination with a dust seal (to prevent ingress of contaminants) or a one-way or partial seal (to allow fluids to escape but not to enter the assembly). In an alternative arrangement (not shown), a leak path (e.g. a small bore or channel) may be formed through or around the annular band 81 so as to allow leaked fuel to escape. This may be particularly useful in conjunction with an elastomeric seal 82, which is an effective two-way seal.

It will be apparent that the arrangements illustrated in FIGS. 2, 3 and 5 may be modified, and that such modifications may fall within the scope of the invention.

For example, although the illustrated attachment mechanism between the tube nut and cylinder head comprises compatible screw-threads, in an alternative arrangement, the tube nut may be connectable to the cylinder head by means of any appropriate fixing member, provided an axial load can be transmitted to the head of the fuel pipe to create a seal with the injector. The fixing member may comprise at least one bolt or screw which is located between the tube nut and the cylinder head. In such arrangements the tube nut may be provided with a radially extending circumferential flange, the flange having at least one axial through-bore for receiving a fixing member, such as a bolt or screw. Thus, the cylinder head is provided with at least one fixing member hole (e.g. in the form of a screw-threaded bore) arranged, in use, to axially align with the at least one axial through-bore of the flange. In this way, a fixing member can be passed through the axial through-bore of the flange and into the fixing member hole of the cylinder head in order to secure the tube nut to the cylinder head. An advantage of this embodiment is that it is not necessary to twist (rotate) the tube nut into the cylinder head, so there is reduced friction between components, and less wear on the cooperating surfaces of the tube nut and the cylinder head. In one such arrangement, when correctly assembled and engaged, the flange is axially spaced from the opposing surface of the cylinder head. In this way, when the tube nut is secured within the passage of the cylinder, the axial load between fixing members and the flange is transmitted from the tube nut directly to the head of the fuel pipe (rather than to the cylinder head), to provide a greater sealing pressure between the fuel pipe and the seating surface of the fuel injector.

In an embodiment where the tube nut is engaged non-rotationally with the cylinder head, the tube nut may be provided with an anti-rotation system, for example, in the form of: an axial rib arranged to align, in use, with an axial recess formed in the fuel pipe passage or bore; or an axial recess in the tube nut that is arranged to be aligned with a similar axial recess in the fuel pipe passage or bore, and a steel bearing (or similar member) being located within these recesses to restrict or prevent angular movement of the tube nut within the bore.

Although in some embodiments the fuel pipe passage extends substantially perpendicularly to the axis of the injection nozzle within the injector pocket, it will be appreciated that this need not be the case and that the invention is also applicable to arrangements in which the fuel pipe passage and the axis of the injector pocket subtend an angle other than 90°.

While the depicted embodiments show the locking nut with an external screw-thread for engaging an internal screw-thread of the tube nut, it is possible for the locking nut to be adapted to receive a portion of the proximal end of the tube nut such that the attachment mechanism comprises an internal screw-thread over a portion of the locking nut and an external screw-thread over a portion of the tube nut.

It should also be appreciated that the exact location of any external seals (e.g. seal 25), between the tube nut and the cylinder head are not critical provided that they performs the intended function.

As is known in the art, in any embodiment, the annular chamber formed between the wall of the bore 17 and the outer wall of the fuel pipe 5 may be arranged to communicate with a low pressure drain chamber (not shown).

Although particular embodiments of the invention have been disclosed herein in detail, this has been done by way of example and for the purposes of illustration only. The aforementioned embodiments are not intended to be limiting and the invention is defined by the scope of the appended claims.

The invention claimed is:

1. A fuel pipe assembly for supplying fuel to a fuel injector, the fuel injector to be located within a bore of an engine cylinder head, the fuel pipe assembly comprising:

a tube nut for connecting the fuel pipe to the fuel injector; and a securing arrangement comprising a locking nut and a deformable clamp member for securing the fuel pipe within the tube nut; wherein the tube nut comprises a tubular member defining an axial bore therethrough to receive a length of the fuel pipe, a distal end shaped for cooperation with the head of the fuel pipe, and a proximal end having an attachment mechanism for engaging a compatible attachment mechanism of the locking nut;

the locking nut is provided with an axial bore to receive a length of the fuel pipe, and an attachment mechanism for engaging the compatible attachment mechanism of the proximal end of the tube nut; and the clamp member defines a bore to receive a length of the fuel pipe and is deformable under compression from an unstrained configuration to a strained configuration; and wherein, in a first state of engagement, the locking nut and tube nut define a volume therebetween that accommodates the clamp member in its unstrained configuration and the fuel pipe is able to move laterally in the region of the clamp member, and in a second state of engagement, the clamp member is compressed between the locking nut and tube nut into a strained configuration such that lateral movement of the fuel pipe is constrained, thereby to secure the fuel pipe within the tube member.

2. The fuel pipe assembly of claim 1, wherein the clamp member comprises a plastically deformable member.

3. The fuel pipe assembly of claim 2, wherein the plastically deformable member is formed of a soft metal.

4. The fuel pipe assembly of claim 2, wherein the securing arrangement comprises a locking nut formed integrally with the plastically deformable member.

5. The fuel pipe assembly of claim 1, wherein the clamp member comprises a plastically deformable member and an elastically deformable member.

6. The fuel pipe assembly of claim 5, wherein the plastically deformable member comprises an annular band, and the elastically deformable member comprises a resilient annular seal carried by the annular band.

7. The fuel pipe assembly of claim 1, wherein the proximal end of the tube nut is provided with an enlarged bore coaxial with bore for receiving at least a portion of the locking nut, and the attachment mechanism for engaging the tube nut with the locking nut comprises an internal screw-thread over at least a portion of the surface of the bore and an external screw-thread over at least a portion of the outer surface of the locking nut.

8. The fuel pipe assembly of claim 1, which is adapted to be received within a bore through the cylinder head so as to engage the fuel injector within the cylinder head.

9. The fuel pipe assembly of claim 1, wherein the tube nut is provided with an attachment mechanism for engaging a compatible attachment mechanism of the cylinder head, and wherein, in use, engagement of the tube nut with the cylinder head causes a substantially fluid tight seal to form between the head of the fuel pipe and the fuel injector.

10. The fuel pipe assembly of claim 9, wherein the attachment mechanism for engaging the tube nut with the cylinder head, comprises a external screw-thread over at least a portion of the outer surface of the proximal end of the tube nut, which in use cooperates with an internal screw-thread over at least a portion of the bore.

11. The fuel pipe assembly of claim 9, wherein the attachment mechanism for engaging the tube nut with the fuel injector comprises a radially extending circumferential flange associated with the tube nut, the flange having at least one axial through-bore for receiving a fixing member for engaging the cylinder head.

12. The fuel pipe assembly of claim 1, which is adapted to mount externally of the cylinder head so as to engage the fuel injector outside of the cylinder head.

13. The fuel pipe assembly of claim 12, wherein the tube nut is provided with an attachment mechanism for engaging a compatible attachment mechanism of the fuel injector, and wherein, in use, engagement of the tube nut with the fuel injector causes a substantially fluid tight seal to form between the head of the fuel pipe and the fuel injector.

14. The fuel pipe assembly of claim 13, wherein the distal end of the tube nut is provided with an enlarged bore coaxial with bore and the attachment mechanism for engaging the tube nut with the fuel injector comprises an internal screw-thread over at least a portion of the surface of the bore, which in use cooperates with an external screw-thread over at least a portion of the fuel injector.

15. The fuel pipe assembly of claim 13, wherein the attachment mechanism for engaging the tube nut with the fuel injector comprises a radially extending circumferential flange associated with the tube nut, the flange having at least one axial through-bore for receiving a fixing member for engaging the cylinder head.

16. The fuel pipe assembly of claim 1, wherein the distal end of the tube nut defines a thrust surface for cooperation with a surface of the head of the fuel pipe, in use to exert an axial load on the head towards the fuel injector.

17. An engine comprising the fuel pipe assembly of claim 1.

18. A clamp member for use in securing a fuel pipe within a tube nut of a fuel supply line in an engine, the fuel supply line comprising at least a fuel pipe, a tube nut, a locking nut and the clamp member: the clamp member having a bore adapted to receive a length of the fuel pipe and being deformable under compression from an unstrained configuration to a strained configuration between the tube nut and a corresponding locking nut in the fuel supply line, wherein in use the strained configuration of the clamp member secures the fuel pipe between the tube nut and the locking nut.

19. The clamp member of claim 18, which comprises a plastically deformable annular band and an elastically deformable resilient annular seal carried by the annular band.

20. A method of securing a fuel pipe to a fuel injector of an engine, the fuel injector to be located within a bore of an engine cylinder head, the method comprising:

providing a tube nut for connecting the fuel pipe to the fuel injector, the tube nut comprises a tubular member defining an axial bore therethrough to receive a length of the fuel pipe, a distal end shaped for cooperation with the head of the fuel pipe, and a proximal end having an attachment mechanism for engaging a compatible attachment mechanism of a locking nut;

providing a locking nut having an axial bore to receive a length of the fuel pipe, and an attachment mechanism for engaging the a compatible attachment mechanism of the proximal end of the tube nut; and providing a clamp member, the clamp member defining a bore to receive a length of the fuel pipe and being deformable under compression from an unstrained configuration to a strained configuration; and fitting the tube nut, clamp member and locking nut over the fuel pipe (5), such that the distal end of the tube nut abuts the head of the fuel pipe and the clamp member is located between the tube nut and the locking nut;

maintaining the locking nut and tube nut in a first state of engagement wherein a volume is defined therebetween that accommodates the clamp member in its unstrained configuration such that the fuel pipe is able to move laterally while a substantially fluid tight seal is formed between the head of the fuel pipe and the fuel injector; and thereafter engaging the locking nut with the tube nut so as to create a second state of engagement in which the clamp member is compressed into its strained configuration between the locking nut and tube nut, whereby lateral movement of the fuel pipe is prevented.

* * * * *